United States Patent
Peng et al.

(10) Patent No.: US 9,760,543 B2
(45) Date of Patent: Sep. 12, 2017

(54) GRAPHICAL TILE-BASED LAYOUT

(71) Applicants: Yu Jun Peng, Shanghai (CN); Chang Jun Hou, Shanghai (CN)

(72) Inventors: Yu Jun Peng, Shanghai (CN); Chang Jun Hou, Shanghai (CN)

(73) Assignee: SAP SE, Walldorf (DE)

( * ) Notice: Subject to any disclaimer, the term of this patent is extended or adjusted under 35 U.S.C. 154(b) by 489 days.

(21) Appl. No.: 14/042,746

(22) Filed: Oct. 1, 2013

(65) Prior Publication Data

US 2015/0089355 A1    Mar. 26, 2015

(30) Foreign Application Priority Data

Sep. 26, 2013 (CN) .......................... 2013 1 0446098

(51) Int. Cl.
G06F 17/21 (2006.01)
G06F 3/048 (2013.01)

(52) U.S. Cl.
CPC ............ *G06F 17/212* (2013.01); *G06F 3/048* (2013.01)

(58) Field of Classification Search
CPC ...................................... G06F 3/048
USPC .......................................... 715/244
See application file for complete search history.

(56) References Cited

U.S. PATENT DOCUMENTS

| | | | |
|---|---|---|---|
| 6,426,761 B1 | 7/2002 | Kanevsky et al. | |
| 6,738,079 B1 | 5/2004 | Kellerman et al. | |
| 8,209,638 B2 | 6/2012 | Hoff et al. | |
| 8,578,330 B2 | 11/2013 | Dreiling et al. | |
| 9,046,984 B2 * | 6/2015 | Flynt | G06F 3/0481 |
| 2004/0246251 A1 * | 12/2004 | Fenney | G06T 11/40 345/426 |
| 2005/0223355 A1 | 10/2005 | Forstmann et al. | |
| 2008/0046928 A1 | 2/2008 | Poling et al. | |
| 2009/0265644 A1 | 10/2009 | Tweed et al. | |
| 2010/0050152 A1 | 2/2010 | Gilboa | |
| 2010/0077328 A1 | 3/2010 | Berg et al. | |
| 2011/0029904 A1 * | 2/2011 | Smith | G06F 3/04883 715/765 |
| 2012/0284620 A1 | 11/2012 | Yach et al. | |
| 2013/0076774 A1 | 3/2013 | Yu et al. | |
| 2013/0083075 A1 | 4/2013 | Luomala et al. | |
| 2013/0111384 A1 | 5/2013 | Kim et al. | |
| 2013/0145259 A1 * | 6/2013 | Kiefer, III | G06Q 30/02 715/249 |
| 2013/0167072 A1 | 6/2013 | Ari et al. | |

FOREIGN PATENT DOCUMENTS

WO    03/102761    12/2003

\* cited by examiner

*Primary Examiner* — Kavita Padmanabhan
*Assistant Examiner* — Tionna Burke

(57) ABSTRACT

Described herein is a technology to facilitate designing or arranging a layout of a page. In one implementation, a tile-based page having one or more tiles forming a page layout is provided. The tile-based page includes a focus tile. In response to a user event to indicate a tile change in the page layout, a tile adjacent in the layout is determined. The tile adjacent is the minimum area to be shifted to effect the tile change. The tile is absorbed into an empty area and the changed layout is analyzed to determine if the tile-based page is a convex page.

20 Claims, 20 Drawing Sheets

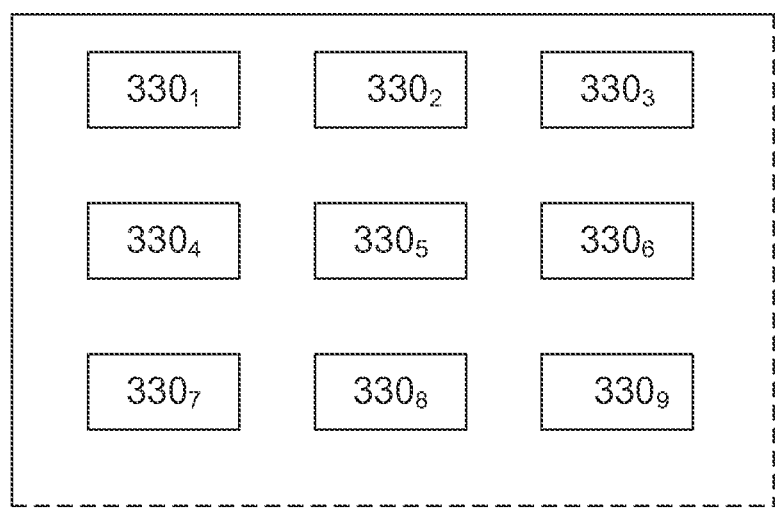
Fig. 3

400

400

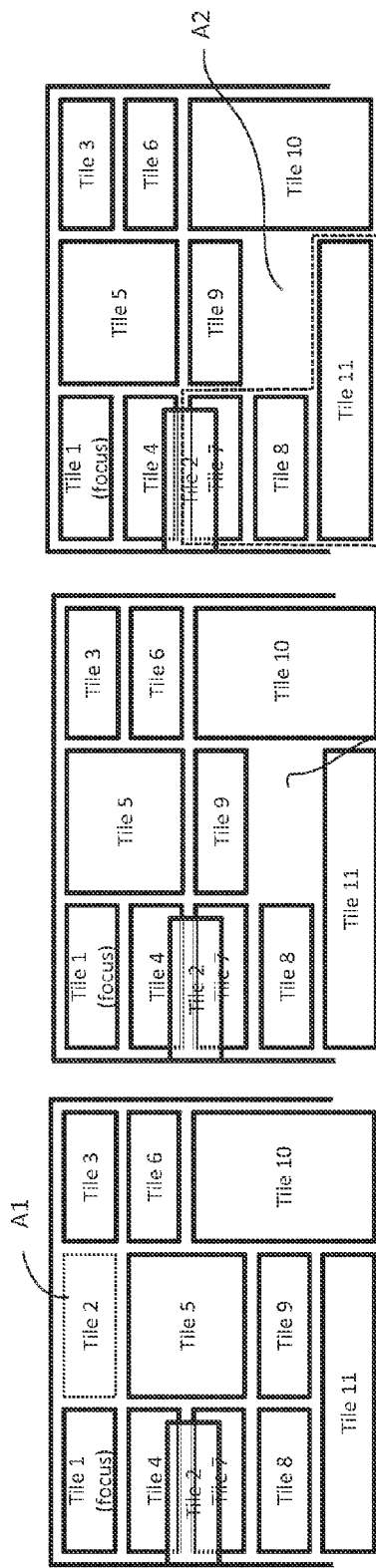
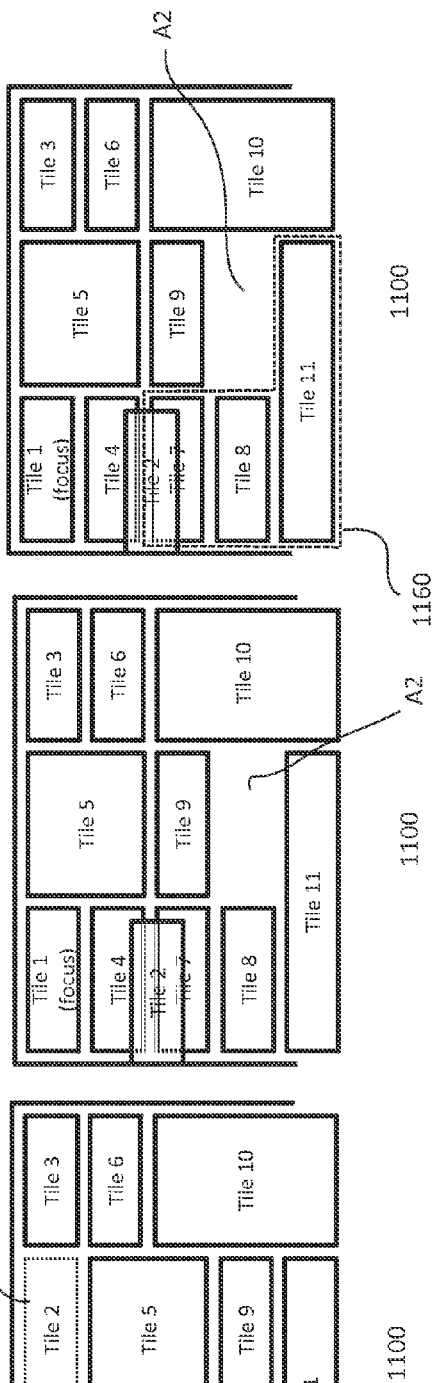
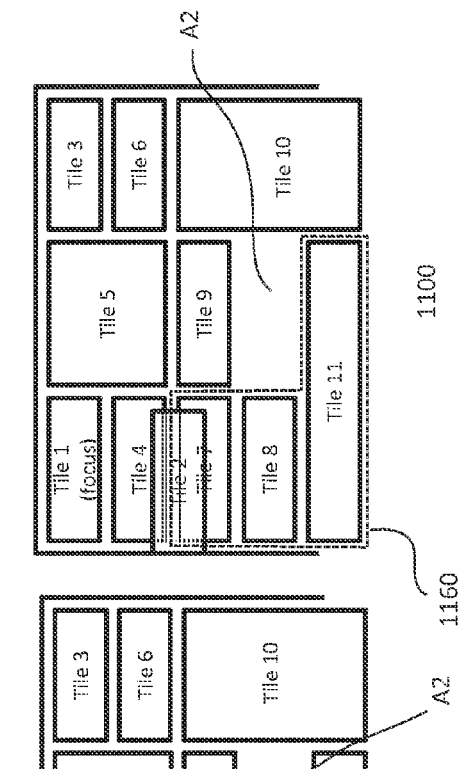
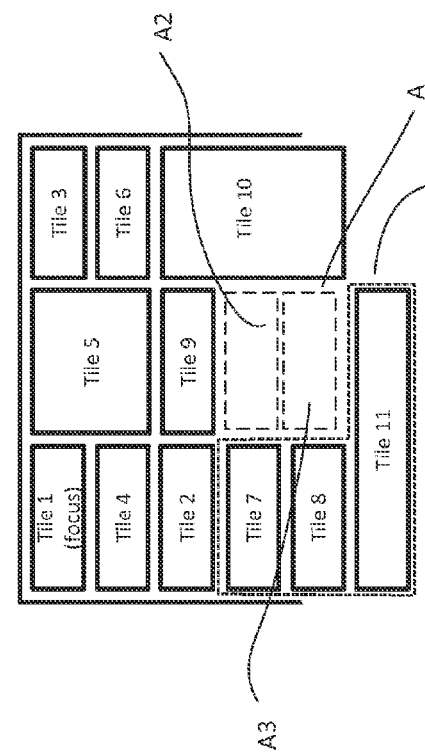
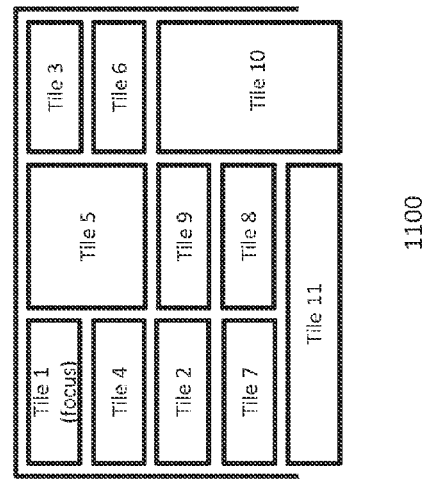

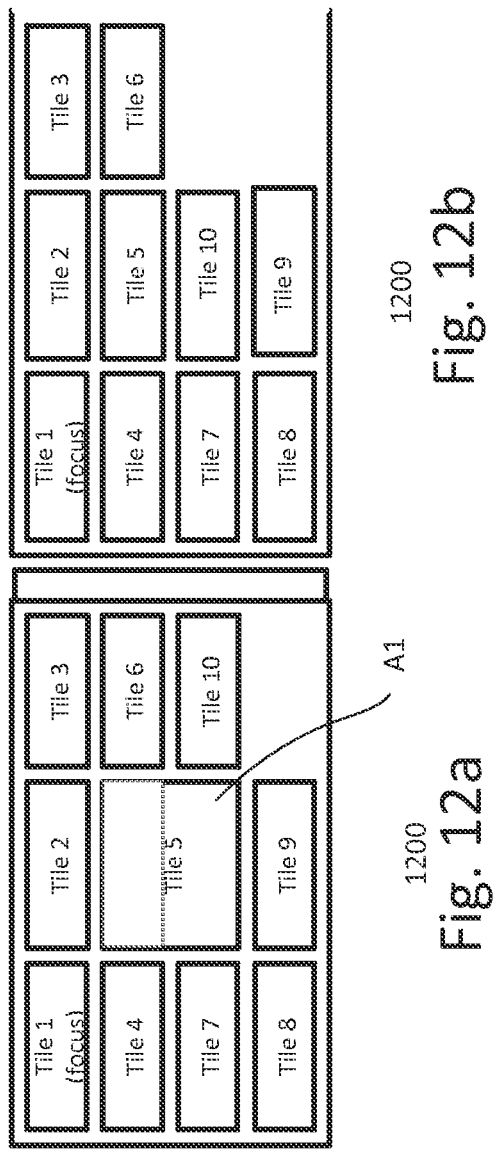

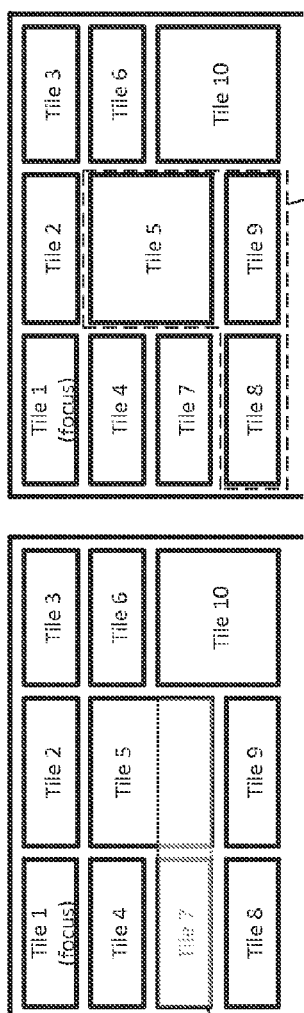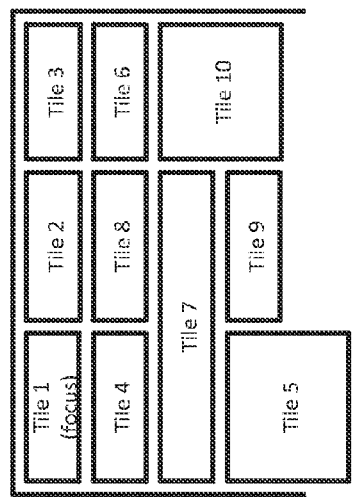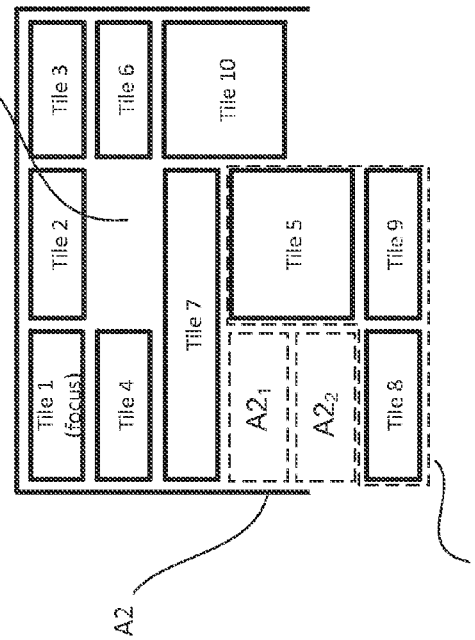

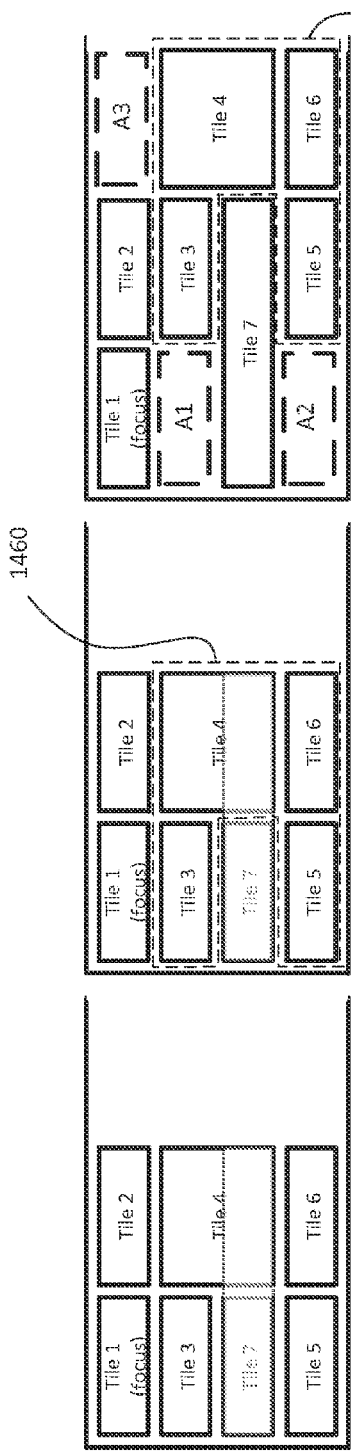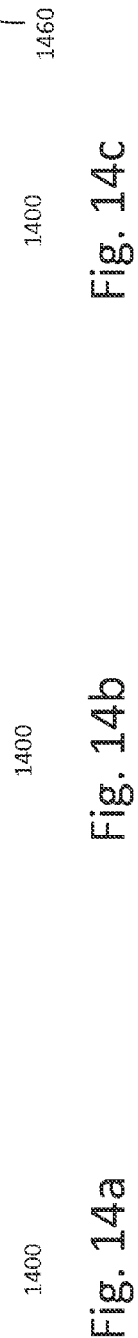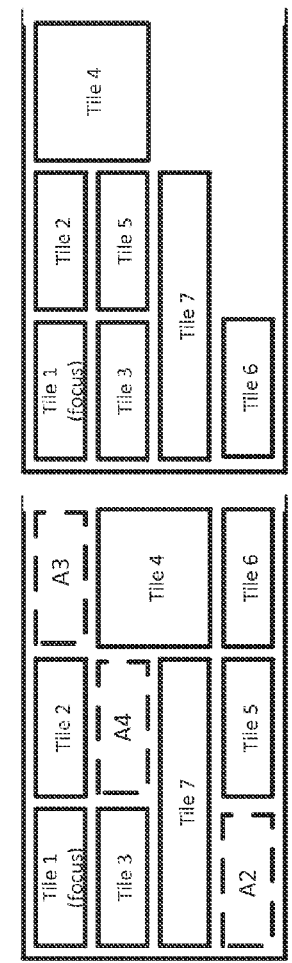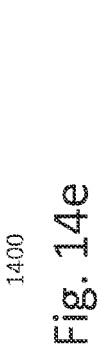
Fig. 14a  Fig. 14b  Fig. 14c  Fig. 14d  Fig. 14e

GRAPHICAL TILE-BASED LAYOUT

TECHNICAL FIELD

The present disclosure relates generally to tools. In particular, the present disclosure relates to a tool for designing or arranging a layout of a page.

BACKGROUND

Software applications may provide end-users flexibility to personalize a layout of a page. For example, tile-based pages are used to enable end-users to personalize the page layout. In a tile-based page, tiles can be flexibly moved from one position to another. Tiles may be icons which represent functional areas. Typical examples include desktops, such as those for smart phones and tablets. The icons may be decorated with information to indicate the function module.

However, conventional tile-based pages typically have uniformly sized tiles. This limits the flexibility of users to personalize the page. Additionally, when a tile is moved, rearrangement of other tiles automatically is limited due to ambiguities of the layout change and does not take user's intention into consideration.

From the foregoing discussion, it is desirable to provide a page which can be flexibly personalized without tile size limitations as well as taking user's intention into consideration for tile rearrangement.

SUMMARY

A technology to facilitate designing or arranging a layout of a page is described herein. In accordance with one aspect of the technology, a tile-based page having one or more tiles forming a page layout is provided. The tile-based page includes a focus tile. The size of any tile of the page includes any multiple of a tile base unit. In response to a user event to indicate a tile change in the page layout, where the tile change includes a tile movement change, a tile resizing change, a tile addition change or a tile deletion change, a tile adjacent in the layout is determined. The tile adjacent is the minimum area to be shifted to effect the tile change. The tile adjacent can include no tiles or one or more tiles. Tiles are absorbed into empty areas created by the tile change. Absorbing tiles includes performing an absorption analysis. An empty area is identified and the tile distance of tiles from the focus tile is calculated. Potential tiles for absorption are identified. One of the potential tiles, if any, is selected for absorption. The selected potential tile is absorbed into the empty area. The view of the selected potential tile takes into consideration of the average view affinity of tiles surrounding the empty area. If more empty areas exist, the absorption analysis is repeated. The changed layout is analyzed to determine if the tile-based page is a convex page.

In accordance with another aspect, a tile-based page having one or more tiles forming a page layout is provided. The tile-based page includes a focus tile. In response to a user event to indicate a tile change in the page layout, a tile adjacent in the layout is determined. The tile adjacent is the minimum area to be shifted to effect the tile change. The tile is absorbed into an empty area and the changed layout is analyzed to determine if the tile-based page is a convex page.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures. Like reference numerals in the figures designate like parts.

FIG. 3 illustrates an exemplary embodiment of possible focus tile locations in a tile page;
FIGS. 11a-11e, 12a-12b, 13a-13d and 14a-14e show various embodiments of tile changes.

DETAILED DESCRIPTION

Figure 1:
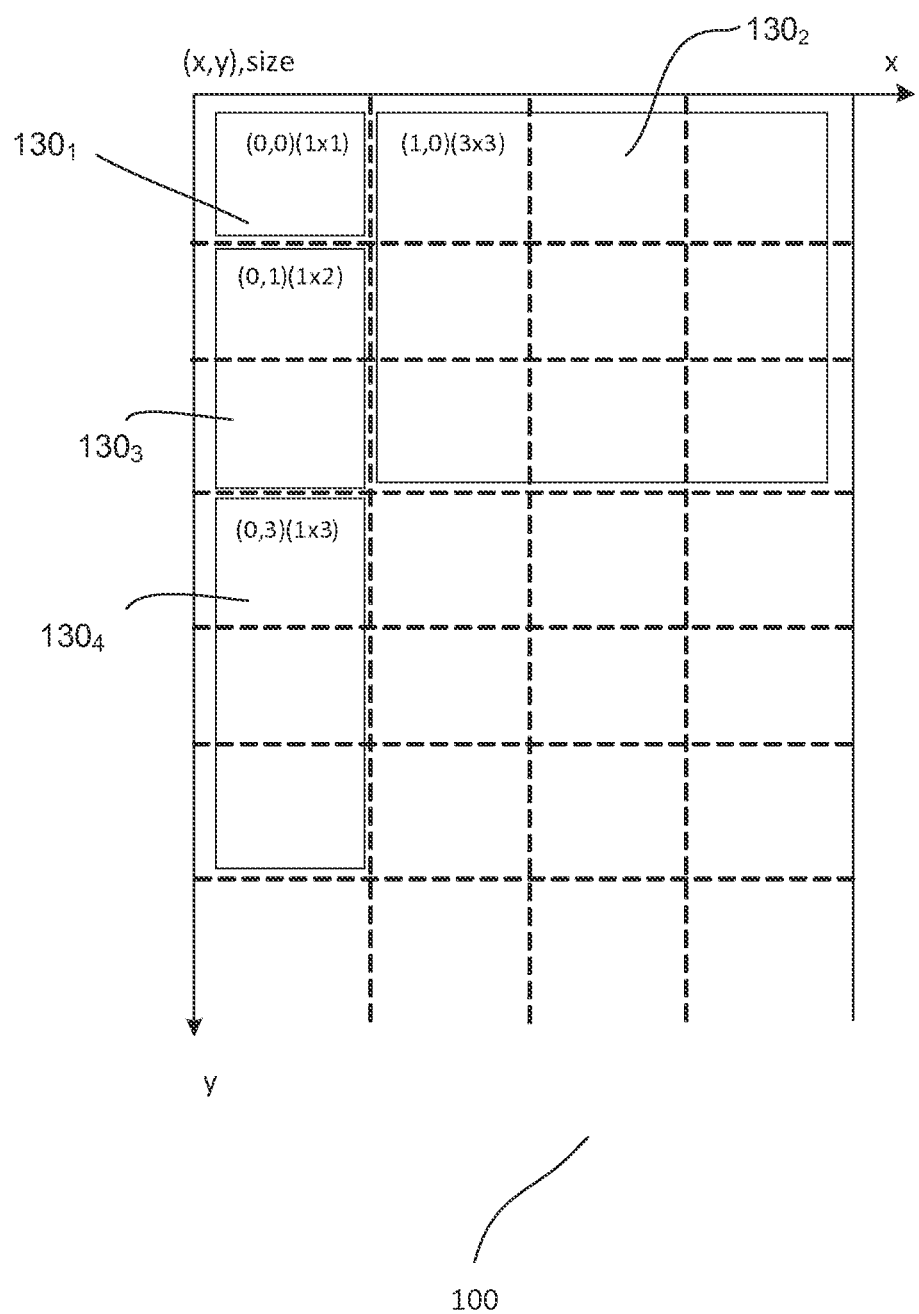
FIG. 1 shows an exemplary embodiment of a tile page.

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of present frameworks and methods, and to thereby better explain the present frameworks and methods. Furthermore, for ease of understanding, certain method steps are delineated as separate steps; however, these separately delineated steps should not be construed as necessarily order dependent or being separate in their performance.

The present disclosure is directed to a layout arranger. The layout arranger, for example, may be employed in an environment. The environment may have a client/server architecture. For example, the environment may be a distributed client/server architecture. A client server architecture may have one or more clients and one or more servers communicatively coupled via a communication network. The communication network, for example, may be a local area network (LAN) which interconnects different devices, such as the clients and server. Other types or configurations of networks may also be useful. For example, the network may be interconnected to other networks through wide area network (WAN) or internet. The devices may be coupled via the network by wireless and/or wired connections. Clients may access the server or servers for storage or retrieval of information. Furthermore, a server may facilitate communication between clients.

A server, in one embodiment, may be a computer which includes a memory and a processor. The memory of a server may include any memory or database module. The memory may be volatile or non-volatile types of memories, such as magnetic media, optical media, random access memory (RAM), read-only memory (ROM), removable media, or any other suitable local or remote memory component. The server is configured to transmit, receive, process and store information or data associated with the environment. Various types of computers may be employed. For example, the computer may be a mainframe, workstation, as well as other types of processing devices. The server may be adapted to execute any operating system. For example, the operating system of the server may be z/OS, Linux-Intel, Linux/390, UNIX, or Windows Server. Other types of operating systems may also be used. The server may also include or be communicatively coupled with a web server and/or a Simple Mail Transfer Protocol (SMTP) server.

A client may be a local or remote computing device with, for example, local memory and a processor. The memory may include fixed and/or removable storage media such as a magnetic computer disk, CD-ROM, or other suitable media. Various types of processing devices may serve as a client. For example, the client may be a PC, tablet PC, workstation, network computer, kiosk or a mobile computing device, such as a laptop, tablet or a smart phone. Other types of processing devices may also be used. A client can receive, transmit, process and store any appropriate data associated with the architecture.

Client/server (C/S) applications may be provided in the environment. Generally, C/S applications include front end and back end portions. The front end portions are stored locally on the clients while the back end portions are located in the server. Various types of C/S applications may be provided in the environment. The C/S applications, for example, may include business applications. Such applications, for example, maintain data of a business or company and may include, for example, SAP Business One. Other types of applications, including non-C/S applications, may also be useful.

The layout arranger is a software tool for designing or arranging a layout of a page. In one embodiment, the layout arranger facilitates designing or arranging a tile-based layout of a page. The page, for example, may be a web or html page, a desktop, a landing page or a user interface (UI) page. Other types of pages may also be useful.

FIG. 1 shows an exemplary embodiment of a tile-based layout 100 of a page. As shown, the page is virtually mapped into a grid structure with uniformly sized blocks 130. The blocks, for example, are arranged in a matrix of x columns and y rows, where the first column and first row starts from 0. A block may be designated by the coordinates (x,y), indicating the location of the block within the page layout. For example, the block at the upper left hand corner of the layout may be designated by the coordinates (0,0).

In one embodiment, a block corresponds to a base unit of a tile. A tile has margins around four sides. For example, a tile has right, left, top and bottom margins. A tile center is the crossing point of diagonal lines of the tile. A page may contain many tiles, forming a tile page. The tile of a page may have any size which is a multiple of the base unit. A base unit may have any size. For example, the size of a base unit may be defined by the user or may have a default size. A tile may be as small as 1 base unit or more than 1 base unit. The size of a tile may be represented by notation (mxn), where m is number of units in the width (or x) direction and n is number of units in the height (or y) direction. For example, in the case of a tile having the size of a single base unit, it is designated by the notation (1×1).

Illustratively, the page includes first, second, third and fourth tiles, $130_{1-4}$. The location of the tile is the coordinate of the block at the upper left corner of the tile. The first tile $130_1$ is designated by coordinates (0,0) having a size of (1×1), the second tile $130_2$ is designated by coordinates (1,0) having a size of (3×3), the third tile $130_3$ is designated by coordinates (0,1) having a size of (1×2) and the fourth tile $130_4$ is designated by coordinates (0,3) having a size of (1×3). Other configurations of tiles for the tile page may also be useful. Tiles may be moved or arranged within the tile page.

Figure 2B:
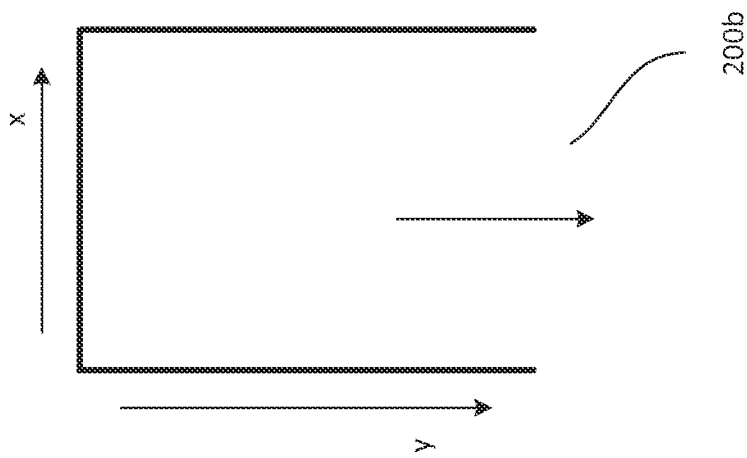
FIGS. 2a-2d show various types of tile pages.
Figure 2A:
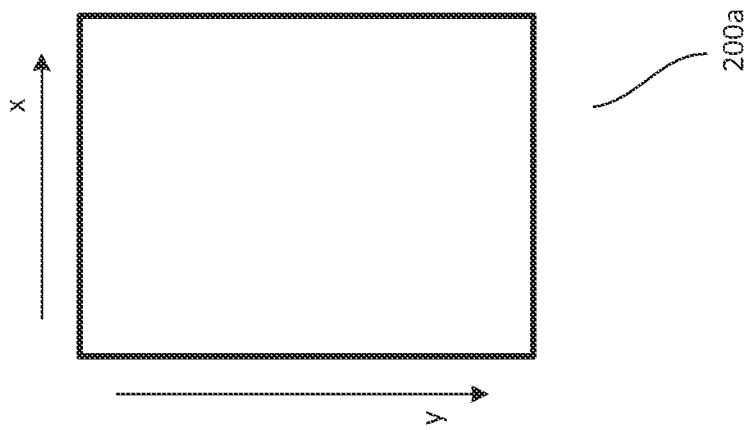
Figure 2D:
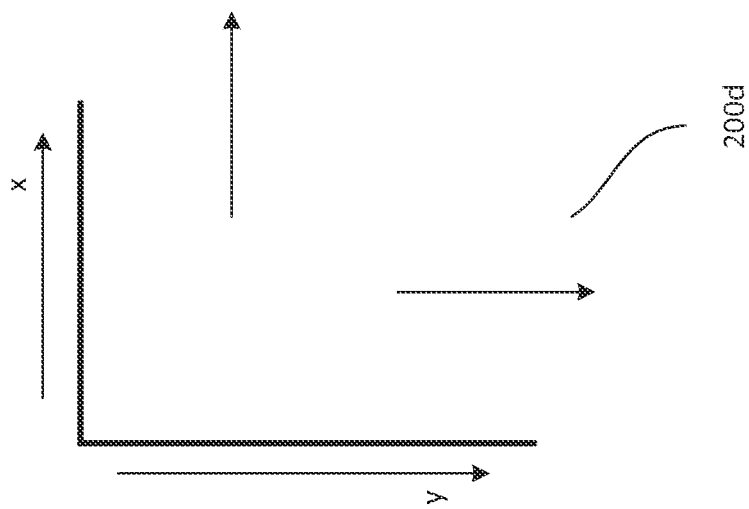
Figure 2C:
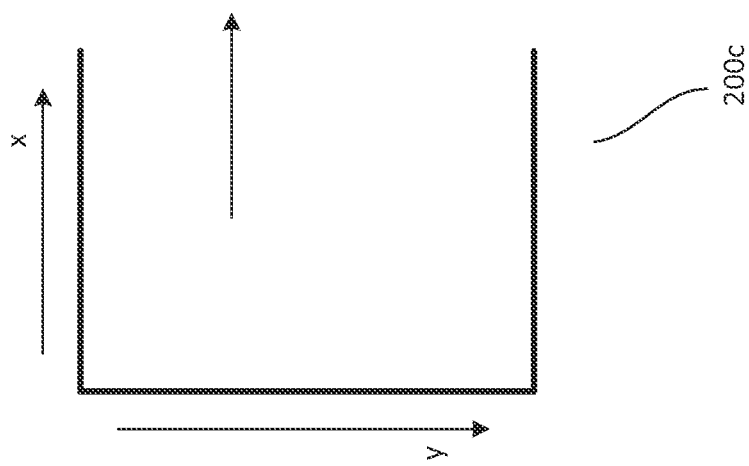

FIGS. 2a-2d show different types of pages. Referring to FIG. 2a, a fixed page 200a is shown. A fixed page includes four borders in which tiles are disposed. FIG. 2b shows a vertical page 200b. In a vertical page, there is no border at the bottom of the page. For example, a vertical page may be expandable from the bottom. There is no limit as to tiles being disposed in the direction of the bottom of the page (e.g., y direction). A horizontal page 200c is shown in FIG. 2c. In a horizontal page, there is no border at the right side of the page. For example, a horizontal page may be expandable from the right side (e.g., x direction) of the page. There is no limit as to tiles being disposed in the direction of the right side of the page. As shown in FIG. 2d, a stretchable page 200d has no borders on the right side and bottom of the page. For example, a stretchable page may be expandable from the right side and bottom of the page. There is no limit as to tiles being disposed in the direction of the bottom and right side of the page.

A tile has a content view. The content view of a tile may be categorized into different categories. For example, the categories of content view may include text, analytics and free style. Providing other categories of the content views may also be useful. Different categories of views may have different or suitable tile sizes. A content view category may have one or more suitable tile sizes.

In one embodiment, a tile page includes a focus tile. The focus tile can be selected by the user. Alternatively, the focus tile may have a default selection. The focus tile is preferably located in the upper left hand corner of the page. The position of the focus tile is a fixed position once it is selected or determined. For example, the focus tile is located at coordinates (0,0). Providing a focus tile at other locations of the page may also be useful. In one embodiment, a focus tile can be any tile which is adjacent to a non-border of the page. As an illustration, referring to FIG. 3, if page 300 is a fixed page, any of the tiles $330_{1-9}$ can be a focus tile. For the case of a vertical page, tiles $330_{1-6}$ may be a focus tile. If the page is a horizontal page, any of tiles $330_1$, $330_2$, $330_4$, $330_5$, $330_7$ and $330_8$ can be a focus tile. For a stretchable page, any of tiles $330_1$, $330_2$, $330_4$ and $330_5$, can be a focus tile.

A focus tile is a benchmark tile for all tile movements, including tile resizing, and tile view changes. The focus tile is defined with a view factor of 1. A tile X includes a view affinity V, which is the coefficient between tile X and the focus tile. For example, affinity of tile X is defined as follows:

$$\text{Affinity } (X,V) = \text{factor}*\text{ratio of view type} + (1-\text{factor})*\text{ratio of fields};$$

The ratio of view types specifies the ratio between view types. For example, in the case of text type to free type, the ratio of view types may be 0.8. The factor is a predefined ratio, for example, from 0 to 1. The ratio of fields is determined by:

2*count (fields shared by view of focus tile and view $V$ of tile $X$)/count (all fields of the view of focus tile and view $V$ or tile $X$)

In one embodiment, a final tile page should be tile convex. For example, a changed tile page should result in a page which is tile convex. A tile convex page is a page which satisfies both of the following conditions:
1) all lines from the center of the focus tile to the center of non-focus tiles do not cross over an empty area which is equal to at least one base unit (e.g., contains at least a 1×1 tile); and
2) a line which crosses an empty area which is equal to at least one base unit is longer than all other lines from the focus tile to the center of a non-focus tiles.

Failure to satisfy both conditions would result in a page which is not tile convex.

Figure 4A:
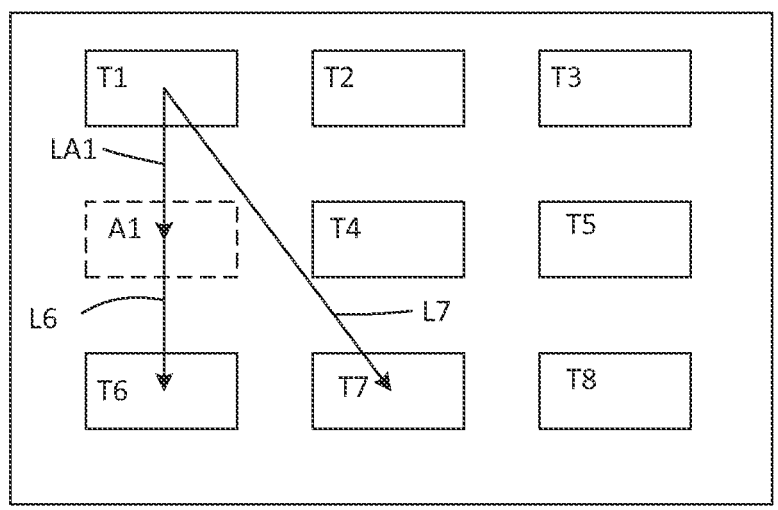
FIGS. 4a-4c show examples of non-convex and convex tile pages.
Figure 4B:
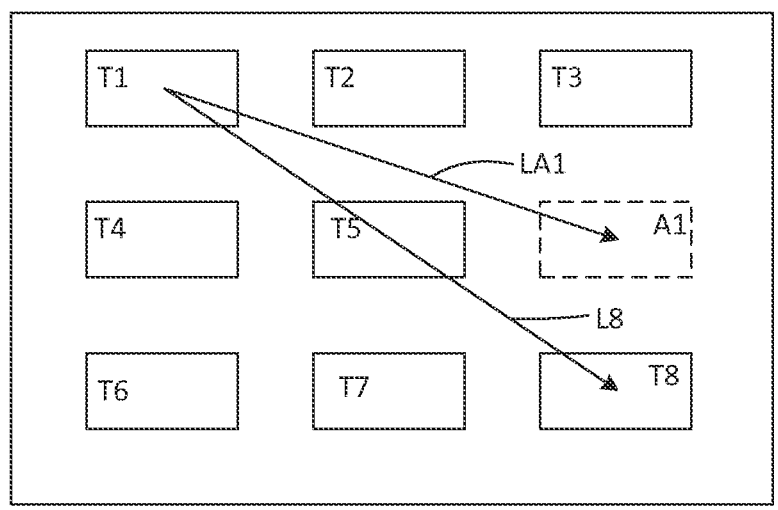
Figure 4C:
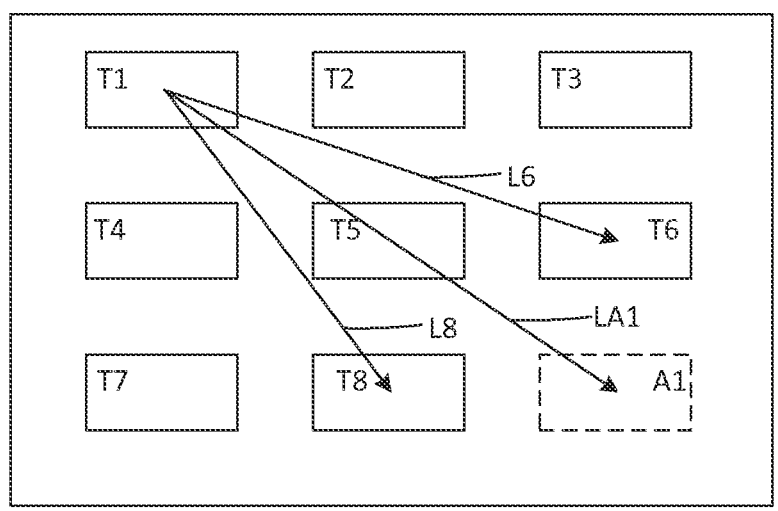

FIGS. 4a-4c show examples of non-convex and convex tile pages 400. The pages, as illustrated, are fixed pages. Providing non-fixed pages, such as vertical, horizontal, and stretchable pages, may also be useful. Illustratively, tile T1 is the focus tile. However, it is understood that other tiles, which can satisfy the conditions of being a focus tile, may also be employed.

Referring to FIG. 4a, the page includes tiles T1 to T8. An empty area A1 is disposed in the page between T1 and T6. The size of A1 is equal to, for example, a base unit of a tile. As shown, a line L6 from the center of the focus tile T1 to T6 crosses A1, which is equal to at least one base unit. Additionally, a line LA1 from the center of the focus tile to the center of A1 is shorter than at least a line L7 from the center of T1 to the center of T7. There are other lines from the center of T1 to other non-focus tiles which are longer than LA1. Clearly, the page is not a convex page since it at least fails one or the two conditions listed above.

Referring to FIG. 4b, the page includes tiles T1 to T8. An empty area A1 is disposed in the page between T3 and T8. The size of A1 is equal to, for example, a base unit of a tile. As shown, no lines from the center of the focus tile to the center of the non-focus tiles cross A1 or an area which is at least equal to the base unit. However, LA1 is shorter than L8. This means that the second condition for a convex page is not satisfied. As such, the page is not a convex page.

As shown in FIG. 4c, the page includes tiles T1 to T8. An empty area A1 is disposed at the lower right hand corner of the page. For example, A1 is disposed below T6 and to the right of T8. The size of A1 is equal to, for example, a base unit of a tile. As shown, no lines from the center of the focus tile to the center of the non-focus tiles cross A1 or an area which is at least equal to the base unit. Furthermore, LA1 is longer than any other line, such as L6 or L8, from the center of the focus tile to the center of the non-focus tiles. This means that both conditions required for a convex page are satisfied. As such, the page is a convex page.

In one embodiment, a convex distance that a non-focus tile is from the focus tile can be measured by the units (base units) of weight and width it is away from the focus tile. Weight is the vertical distance (e.g., y direction) from the focus tile while width is the horizontal distance (e.g., x direction) from the focus tile. The total convex distance of a tile page is the sum of the distances of the tiles from the focus tile. The use of weight and width units may also be employed in determining distances between center of focus and non-focus tiles.

Figure 5:
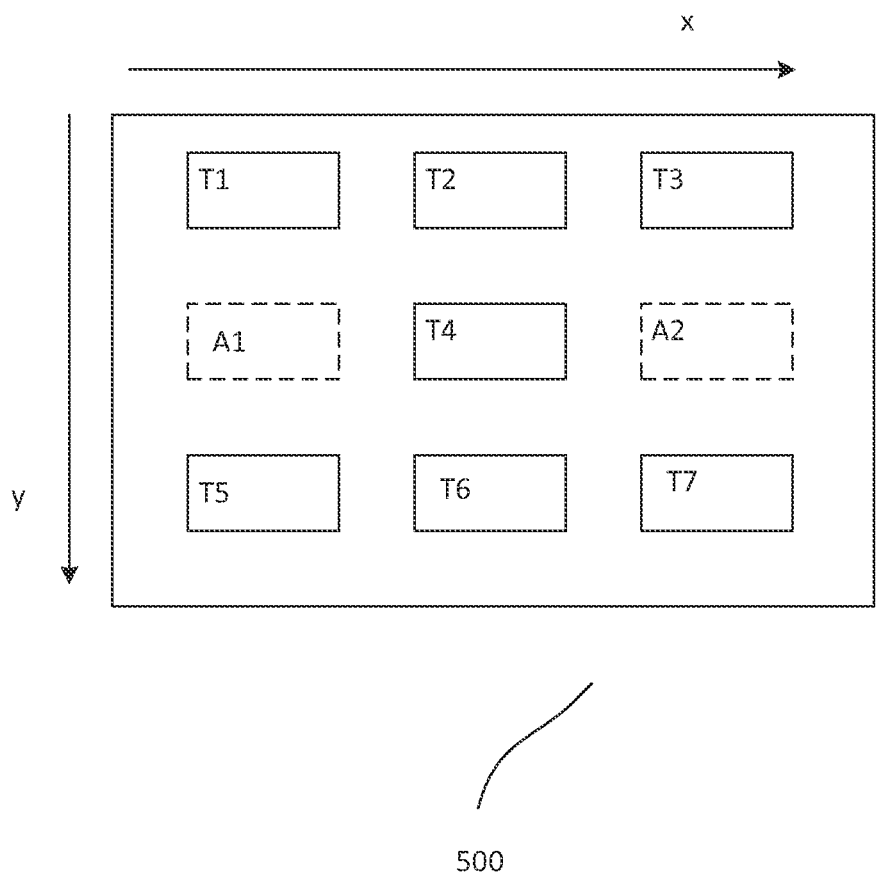
FIG. 5 illustrates measuring the convex distance of a page.

FIG. 5 illustrates measuring the convex distance of a page 500. The page includes tiles T1 to T7, with an empty area A1 disposed between T1 and T5 and an empty area A2 disposed between T3 and T7. As discussed, a convex distance that a non-focus tile is from the focus tile can be measured by the units of weight and width that it is away from the focus tile. Weight is the vertical distance (e.g., y direction) from the focus tile while width is the horizontal distance (e.g., x direction) from the focus tile. As such, T2 has a convex distance of 1, T3 has a convex distance of 2, T4 has a convex distance of 2, T5 has a convex distance of 2, T6 has a convex distance of 3 and T7 has a convex distance of 4. As such, the convex distance of the page is the sum of the convex distances of the tiles, which is 14.

Figure 6:
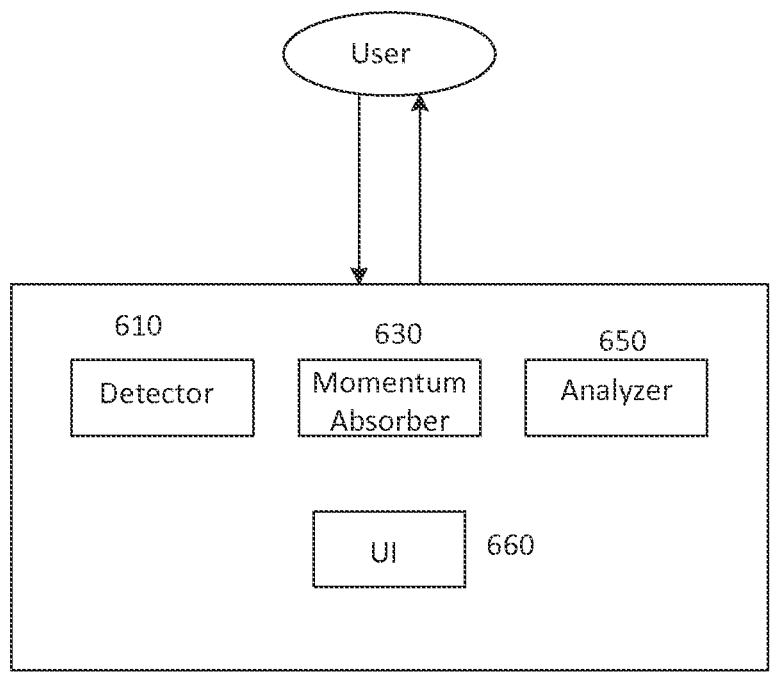
FIG. 6 shows an embodiment of a layout arranger.

FIG. 6 shows a block diagram of an embodiment of a layout arranger 600. The layout arranger includes various modules. In one embodiment, the layout arranger includes a layout change detector module 610, a momentum absorption layout modifier module or momentum absorber module 630, and a layout analyzer module 650. A user interface (UI) module 660 may also be provided. Providing other modules or configurations of modules may also be useful.

The layout arranger interacts with a user. For example, a user may provide information. The information may be provided by the user, such as making changes to a layout. The layout arranger may also provide information to the user. Other types of interactions may also be useful. Interactions between the user and layout arranger may be facilitated by the UI module.

The layout change detector module 610 detects changes to a tile-based layout. A change to the layout, for example, may be made by a user or designer of the page. The change may include changing tile location, changing tile size, adding a tile and removing a tile. Other types of changes may also be useful. To change location of a tile, a drag-and-drop technique may be used. As for changing the size of a tile, a user may select the tile and input the changes. To add a tile, the user selects a location of the tile to be added. To delete a tile, the user selects a tile and deletes it. Other techniques for effecting tile changes may also be useful.

The layout change detector module 610 provides change information to the momentum absorber module 630. The change information is used to effect the change to the layout. As discussed, a change may include tile location change, tile size change, as well as tile addition and tile removal. Other types of changes may also be useful.

When a change is initiated by the user, the momentum absorber module determines a tile adjacent in the layout. The tile adjacent is the smallest area which is shifted to allow for the change to occur. The tile adjacent can be null or 1 or more tiles, depending on the circumstances of the change. The shifting of the tile adjacent is towards the expandable border of the page. For example, in the case of a vertical page, the shift is downwards and to the right for a horizontal page. In the case of a fixed or stretchable page, the user may select a preference for shift direction. If no preference is selected, the layout arranger may have a default shift direction.

Figure 7B:
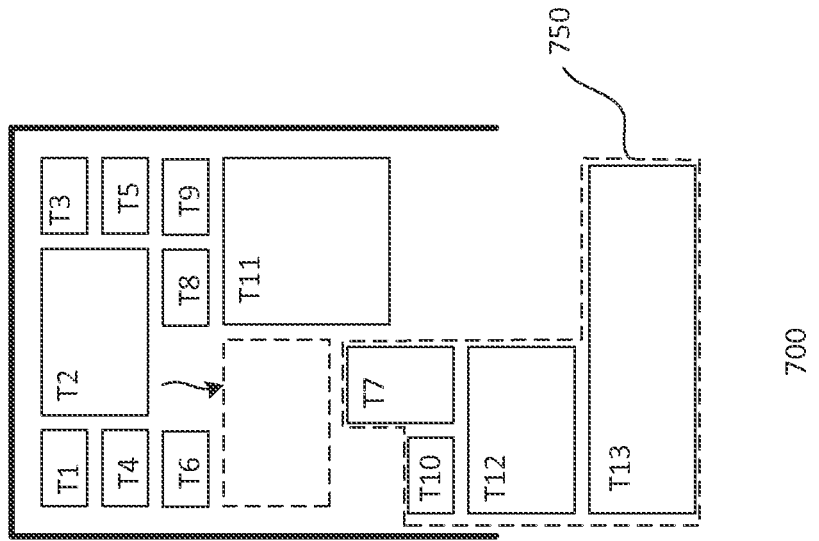
FIGS. 7a-7b illustrate an example of moving a tile in a page.
Figure 7A:
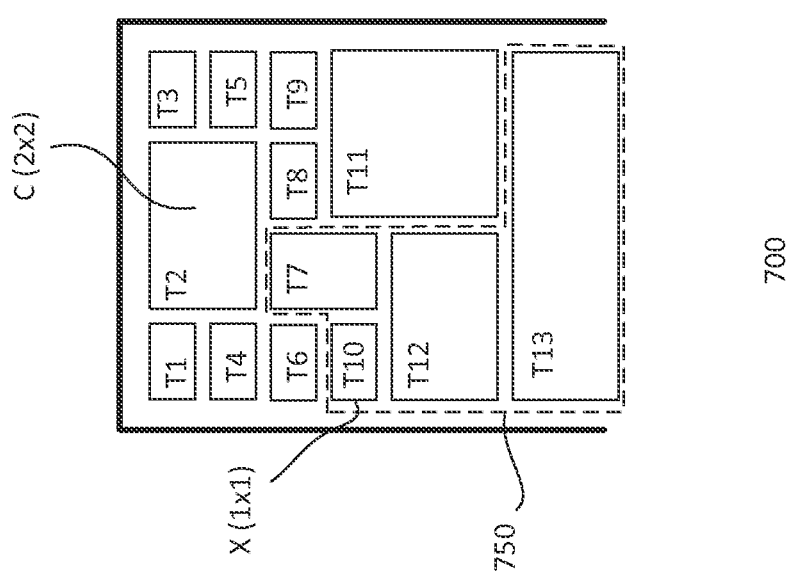

FIGS. 7a-7b illustrates an example of moving a tile in a page 700. As shown, the page is a vertical page and includes tiles T1-T13. The tiles have different sizes. For example, T1, T3-T6 and T8-T10 are 1×1 or the same as the base unit, T7 is 1×2, T2 and T12 are 2×2, T11 is 2×3 and T13 is 4×2. The focus tile, for example, is T1 As shown in FIG. 7a, T2 is selected to be changed. The tile T2 is selected to be moved. The change tile C (m×n), in this case, has a (2×2) tile size (e.g., m=2 and n=2). The location to which C is moved is X. Location X has an area of X (p×q). In this case, location X has an area of 1×1 defined by T10 (e.g., p=1 and q=1). In other cases, location X may be an empty area. Other configurations of moving a tile may also be useful.

In determining the tile adjacent, the type of page is taken into consideration. The page, as shown, is a vertical page. In a vertical page, movement is towards the expandability of the page. For example, in the case of a vertical page, it is towards the bottom of the page. For a horizontal page, the movement is towards the right side of the page. As discussed, the user may define the preference of the direction of movement in the case of a fixed or stretchable page. A default direction of movement may be provided by the layout arranger. Alternatively, the layout arranger may include a default movement of direction unless overridden by the user's preference. Other configurations of direction of movement may also be useful.

For the case of a vertical page, if m=p, then there is no need to select tiles which are to the right of X. On the other hand, if m>p, one or more tiles to the right are selected until X is sufficient to accommodate M. For example, right tiles are selected until m≤sum of the widths of X and the tiles to the right of X. Tiles which are under X and the right tiles are also selected and form a tile adjacent 750. Illustratively, T10 T7 and T12-T13 form tile adjacent.

The tile adjacent is moved sufficiently towards the bottom of the page to accommodate the C tile (e.g., T2), as shown in FIG. 7b. For example, the tile adjacent is moved away from the focus tile vertically down by two base units, creating a space for T2 to occupy.

In the case if the page were a horizontal page, the tile adjacent would include T5 -T9. The tile adjacent would be moved horizontally to the right two base units to create a space for T2 to occupy.

Referring back to FIG. 6, the momentum absorber module determines empty area or areas in the tile page to be absorbed. For example, after effecting the change, empty area or areas may exist. For example, an empty area may exist from where tile C was moved. Additionally, empty areas may exist by moving tile adjacent to accommodate tile C. The empty area or areas absorb other tiles in the page, if possible. For example, other tiles in the page may be migrated to the empty areas.

In one embodiment, the empty areas are absorbed by the focus tile. For example, empty areas are absorbed by tiles toward the direction of the focus tile. The absorption may be in either the horizontal or vertical direction. For example, absorption is in the x or y direction. In the case where more than one tile can fill the empty area, the tile moving from the direction of expandable border has the preference. Providing absorption in other directions may also be useful.

Figure 8C:
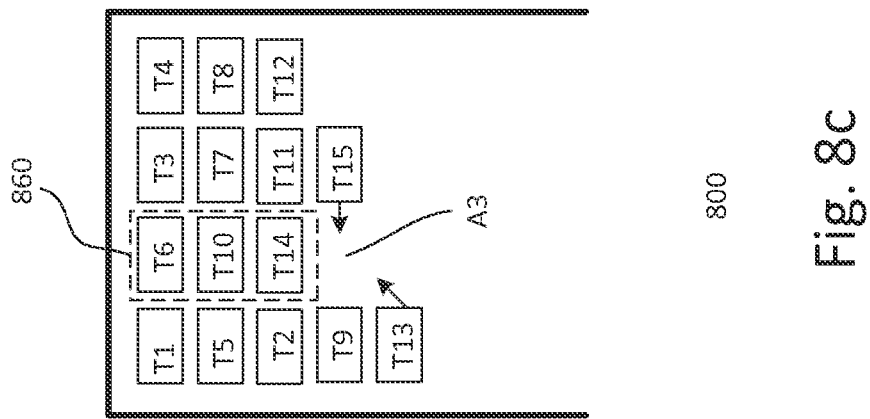
FIGS. 8a-8c show a simple example of absorption in a page and
FIG. 8d shows an example of view changing based on average affinity of surrounding tiles.
Figure 8B:
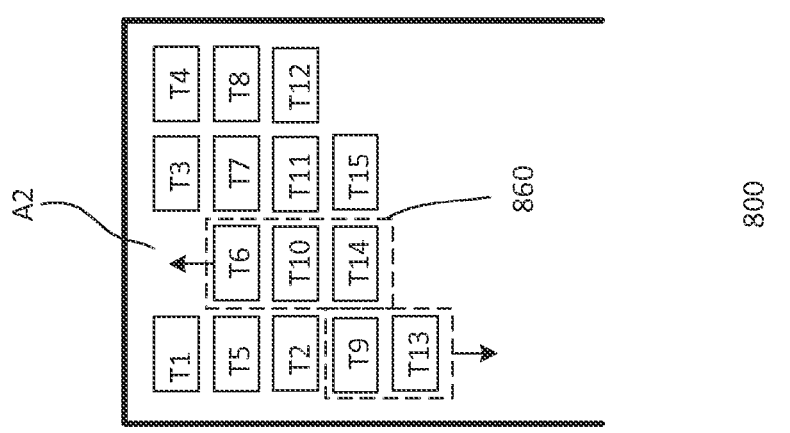
Figure 8A:
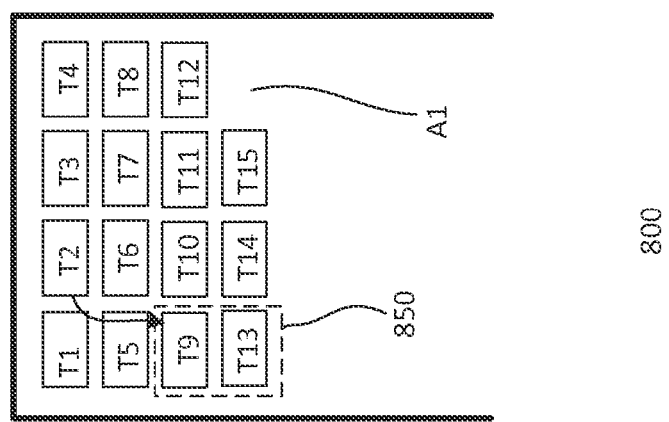

FIGS. 8a-8c show a simple example of absorption in a page 800. As shown in FIG. 8a, the page is a vertical page and includes tiles T1 -T15. Tile T1 for example, is the focus tile. The page is a convex page even though there is an empty area A1 adjacent to T15 and T12. However, since both conditions for a convex page are satisfied, the page is a convex page. The tiles are all of the same size. For example, all of the tiles are 1×1 (e.g., base unit). As shown, T2 is selected to be moved to the location occupied by T9. A tile adjacent 850, which includes T9 and T13is defined.

Referring to FIG. 8b, the tile adjacent is shifted downwards by, for example, one base unit. This provides sufficient area for T2 to occupy. The movement of T2 to where T9 was previously located causes an empty area A2 to be created. If a tile can be shifted to fill A2 it is shifted. Illustratively, T6 or T3 can be shifted to fill A2. In one embodiment, the tile which is moving from the direction of the expandable border has the preference. In this case, T6 is shifted to fill A2. Tiles which can be moved along with T6 are also moved, creating momentum absorption. For example, T10 and T14, along with T6, form a momentum group 860 and are shifted by momentum absorption, as shown in FIG. 8c. This creates an area A3 between T9 and T15.

Area A3 may be filled by either T13 or T15. Another option would be to absorb T12 into A3. In one embodiment, the filling of A3 should result in the layout having a smaller convex value. Furthermore, the preference is in the direction of the type of page. In this case, the page is a vertical page, giving preference to absorption in the vertical direction. Using these preferences, A3 is filled with T13. The resulting convex value is smaller than before the absorption.

Figure 8D:
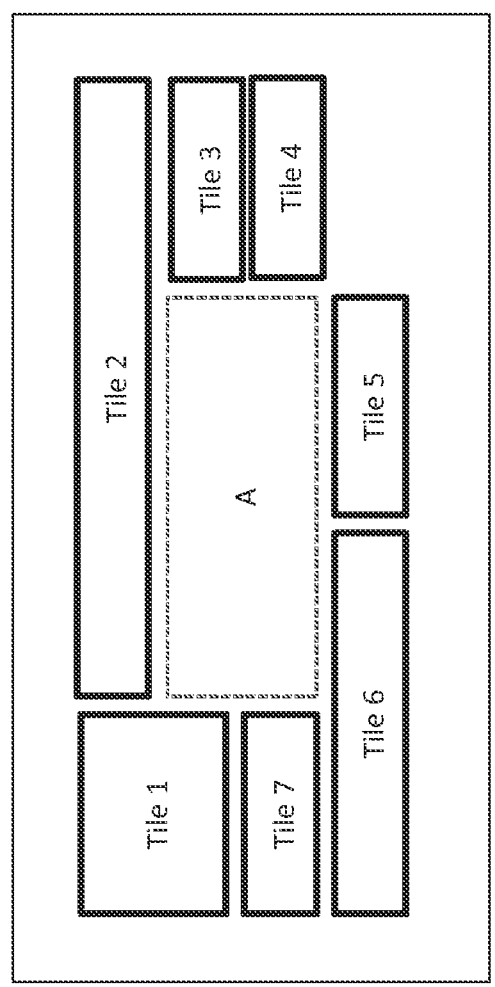

FIG. 8d illustrates an example of view changing based on average affinity of surrounding tiles in a page 805. As shown, an empty area A having a 2×2 size is surrounded by Tiles 1-7. If Tile X is absorbed into A, its view may be changed according to the average view affinity of the surrounding tiles.

Assume Tile X can have the following views:
a) V1—0.8;
b) V2—0.7;
c) V3—0.6; and
d) V4—0.5.

Of the views, only V1 and V2 support a 2×2 size. The current view affinity of the Tiles 1-7 are 0.5, 0.4, 0.6, 0.5, 0.8, 0.7 and 0.6. In such case, the surrounding average view affinity of the empty area is 0.59, which is equal to the sum of view affinities divided by 7, the number of surrounding tiles. Tile X should adopt a view which has the nearest affinity to the average affinity of the surrounding tiles. In this case, Tile X should adopt V2. This is because V2 has the nearest affinity to the surrounding Tiles which can support a 2×2 size. If Tile X already has V2, then there is no need to change. On the other hand, if Tile X has V1, then it is changed to V2. In one embodiment, view change based on average view affinity of surrounding tiles applies for momentum absorption or tile resizing, not to manual movement of a tile. Other configurations of view affinity may also be useful.

Referring back to FIG. 6, the analyzer 650 analyzes the changed layout. In one embodiment, the analyzer analyzes the changed layout to determine whether it is a convex page. If the page is convex, the user may save the layout page or to cancel the change. Canceling the change returns the layout page to its initial state. On the other hand, if the page is non-convex, the UI module 660 may inform the user indicating that the page is not convex. The user may have the option to adjust the changed layout page. For example, the user may change tile locations or tile sizes, after which, momentum absorption and analysis are repeated. If the changes are canceled, the page returns to its original state.

Figure 9:
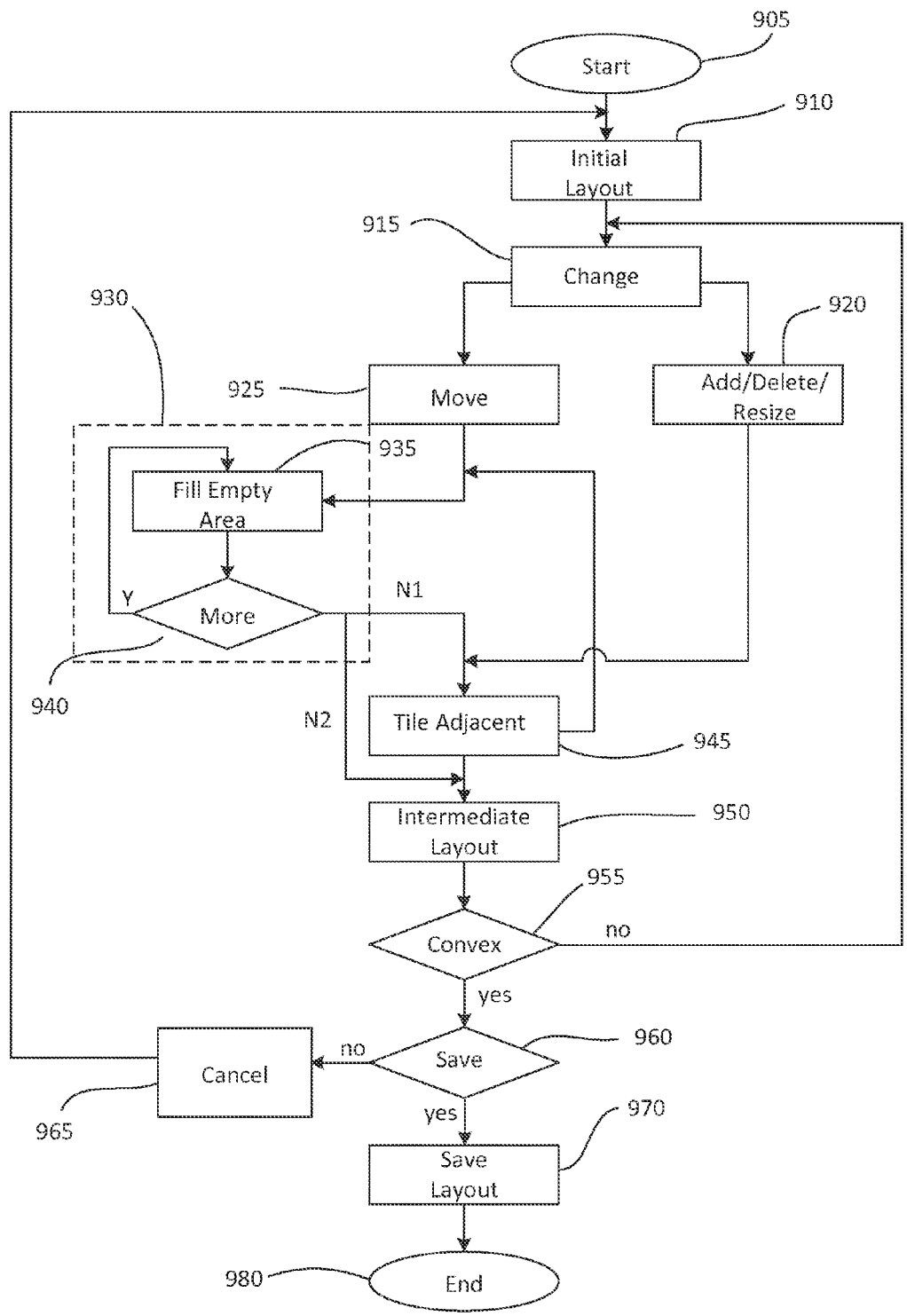
FIG. 9 shows an embodiment of a process flow of a layout arranger.

FIG. 9 shows an embodiment of a process 900 for arranging a layout. As shown, the layout arranger is initiated at step 905. When initiated, an initial layout of a page is provided at step 910. The layout, in one embodiment, is a tile-based layout. The page may be any type of page, such as fixed, horizontal, vertical or stretchable. The page includes tiles and may be convex or non-convex.

At step 915, a user may make a change to the initial layout. The change, for example, is a tile change, which may include moving a tile from one location to another, changing the size of a tile, adding a tile or removing a tile. Other types of tile changes may also be useful. The change, for example, is detected by the layout change detector module of the layout arranger.

At step 920, the process detects that the change is adding, deleting or resizing a tile. In the case of adding, deleting or resizing a tile, the process proceeds to step 945. Deleting or resizing a tile may be indicated by selecting the tile to be deleted or resized while adding a tile may be indicated by selecting the location at which a tile is to be added. In the case of adding and resizing a tile, information such as tile size is provided. Other information, including view type, may also be included.

On the other hand, at step 925, the process detects that the change is a move tile change. A move tile change may be indicated by, for example, dragging a selected tile and dropping it at the desired location. The process proceeds to step 930 for momentum absorption of empty area. For example, the empty area vacated by the moved tile is filled at step 935. At step 940, the process determines if there are other empty areas which need or can be filled. If there are other empty areas, the process returns to step 935. When no empty areas exist or can be filled, the process continues to step 945. For example, when an empty area is filled, another empty area may be created. If the newly empty area can be filled, it is filled. The process repeats until no empty area exists or can be filled.

In one embodiment, when an empty area is filled based on momentum absorption, view affinity is taken into account. For example, when a tile is moved, the view of the moved tile may change according to the average view affinity of all the tiles surrounding the empty area. For example, the view of the moved tile may change according to the average view affinity of the tiles bordering the empty area. In one embodiment, an absorbed tile has its view changed according to the average view affinity around the empty area. A resized tile may also have its view changed according to the average view affinity around the empty area. With respect to a tile which is moved, view affinity does not change the view of the moved tile.

Note that when the momentum absorption is initiated by step 925, the process proceeds along the path of N1 to step 945. For example, the momentum absorption may be a routine called by the layout arranger at different stages. For example, in the case that the routine is called at step 925, the process proceeds to step 945.

At step 945, the process determines tile adjacent. For example, tiles which are to be moved to accommodate the change are determined. As discussed, tile adjacent can be no tiles, one tile, or a group of tiles which are moved to accommodate the change. Once the tile adjacent is determined, it is shifted to accommodate the tile change. The tile change is effected after shifting the tile adjacent. In some cases, as discussed, no shifting of tile adjacent is needed to effect the change.

Shifting of the tile adjacent creates one or more empty areas. The process proceeds to 930 for momentum absorption, as previously discussed. When all empty areas are filled or can be filled, the process proceeds to step 950. Note that when the momentum absorption is initiated by step 945, the process proceeds along the path of N2 to step 950. At step 950, the intermediate layout may be temporarily saved.

The layout arranger, at step 955, analyzes the intermediate layout to determine whether it is a convex page or not. If the page is not convex, the process returns to step 915. This enables the user to make further changes to the layout to make it convex.

In the case where the page is a convex page, the process proceeds to step 960. At step 960, the user may select to save the intermediate layout. If the user selects to save the intermediate layout, it is saved at step 970 and the process terminates thereafter at step 980.

On the other hand, if the user does not select saving the intermediate layout, the process continues to step 965. At step 965, the process cancels the changes and returns to step 910 to allow the user to make changes to the initial layout.

Note that the layout arranger may provide the user the option to terminate the process at any stage. For example, a termination or cancel button may be provided at all stages of the process. This enables the user to exit the layout arranger. Termination of the process may result in not saving any changes made to the initial layout. The layout arranger, however, may provide the option for the user to save changes if desired.

Figure 10A:
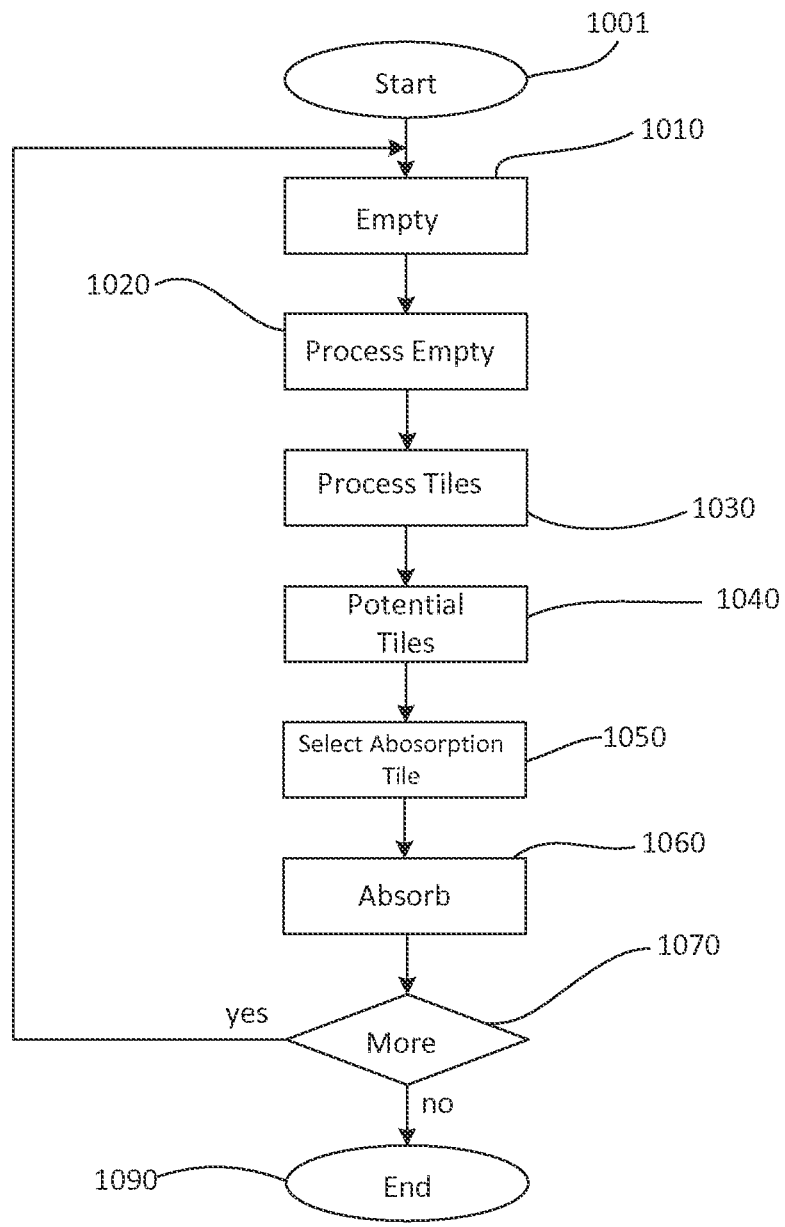
FIG. 10a shows an embodiment of a process for momentum absorption.

FIG. 10*a* shows an embodiment of a process 940 for momentum absorption. When the momentum absorption process is initiated at step 1001, empty areas are identified at step 1010. An empty area is processed at step 1020. Processing the empty area includes, in one embodiment, analyzing it to determine its size. If the empty area is larger than the base unit, it is sub-divided into sub-units equaling the base unit. For example, if an empty area is equal to 3 base units, it is sub-divided into three empty sub-areas, SA1, SA2, and SA3, each having the size equal to the base unit. The empty sub-areas may have any configuration. For example, they may be in a column, in a row, or a combination thereof. In the case of sub-areas, preference in filling is given to the one which is proximate to the focus tile.

At step 1030, the tiles are processed. Processing the tiles includes, for example, determining the distance of a tile from the focus tile. The distance of a tile, for example, is equal to the sum of the width (distance in the row direction) and weight (distance in the column direction) of the tile away from the focus tile. In addition, the process includes identifying the tile size of the tiles. Identifying or determining other tile characteristics may also be useful.

Once the distances of the tiles are calculated, the process identifies potential tiles for absorption at step 1040. Potential tiles may have the following characteristics or conditions:
 1) has the same size as the sub-area;
 2) has a size which can fit into the empty area as a whole; and
 3) absorption preference
  a. horizontal direction in a horizontal page,
  b. vertical direction in a vertical page, or
  c. selected or default preference for fixed or stretchable page.

In one embodiment, a potential tile for absorption satisfies condition 1, condition 2, conditions 1 and 3, or conditions 2 and 3. Providing other conditions may also be useful.

At step 1050, a potential tile is selected to be absorbed into the empty area. For example, a potential tile is selected. In the case where there are more than one potential tiles, the potential tile is selected based on the following preferential order:
 1) conditions 1 and 3;
 2) conditions 2 and 3;
 3) condition 2; and
 4) condition 1.

Providing other preferential orders may also be useful. Based on the preferences, a potential tile which results in a smaller convex value and along the direction of the page type is selected. Using other preferences for selection of a potential tile may also be useful.

The tile with the highest preference is selected for absorption at step 1050. At step 1060, the selected tile is absorbed into the empty area. In one embodiment, absorption of a tile takes into account of tile affinity. For example, a tile which is absorbed may have its view changed based on tile affinity.

At step 1070, the process determines if there are more empty areas for absorption. If there are, the process returns to step 1010. If not, the momentum absorption process terminates at step 1090.

Figure 10B:
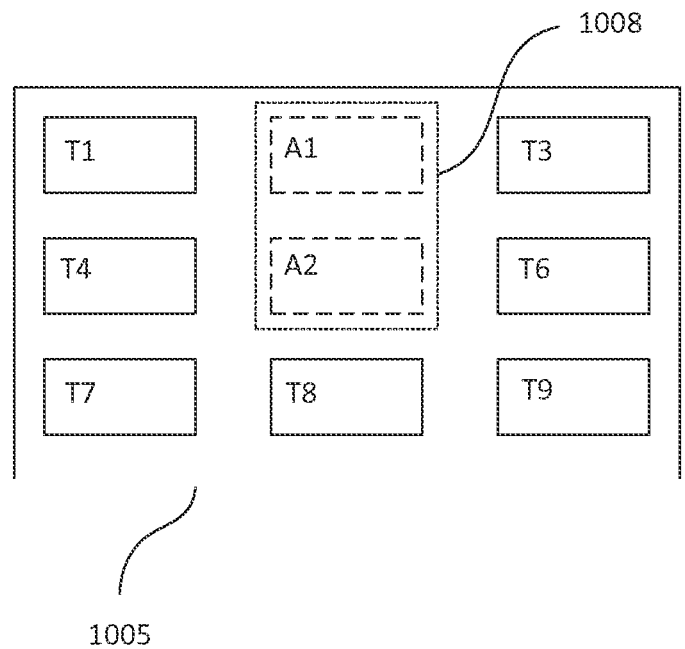
FIGS. 10b-10c illustrate a simple example of momentum absorption for a vertical page.
Figure 10C:
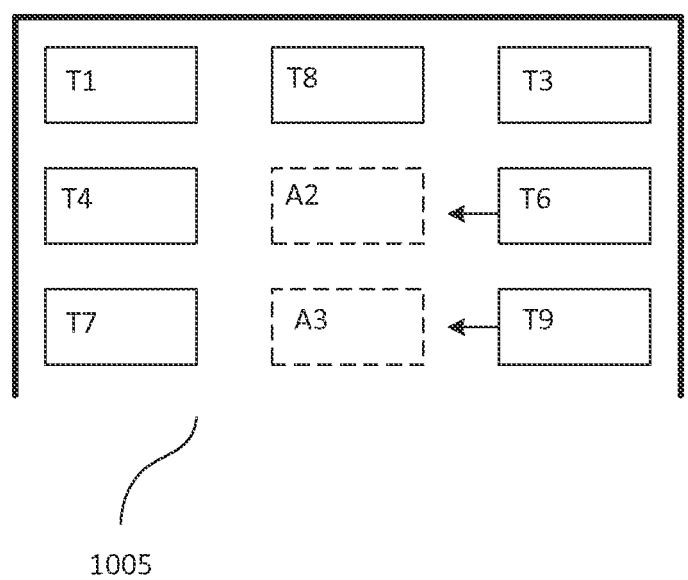

FIGS. 10b-10c illustrate a simple example of momentum absorption for a vertical page 1005. As shown, the page includes tiles T1, T3, T4, T6 and T7-T9, with an empty area 1008. The momentum absorber identifies the empty area. Since the empty area is a 1×2 area, it contains 2 base units. Accordingly, the empty area is divided into A1 and A2.

Based on the conditions for potential tiles, all tiles are potential tiles. However, since the page is a vertical page, preference is to a tile which is in the vertical direction. In this case, T8 has a preference to being absorbed into A1, which is more proximate to the focus tile. Absorption of T8 into A1 results in an empty area A3 being created. Additional absorption analysis is performed. Based on the conditions and preferences, T6 is absorbed into A2 and T9 is absorbed into A3.

FIGS. 11-14 show examples of various tile changes. Referring to FIGS. 11a-11e, an example of a tile movement in a vertical page 1100 is shown. The page includes Tile 1 to Tile 11. Referring to FIG. 11a, Tile 2 is selected to be moved to where Tile 7 is located. The moving of Tile 2 results in an empty area A1. Momentum absorption causes Tile 5 to be absorbed into A1 since the preference is in the vertical direction. In addition, Tile 9 is absorbed along with Tile 5. This is because absorption of Tile 5 results in an empty area which can also be accommodated by Tile 9. This results in an empty area A2.

To accommodate Tile 2, tile adjacent 1160 is determined. Tile adjacent, as shown in FIG. 11c, includes Tile 7, Tile 8 and Tile 11. The tile adjacent is shifted vertically. For example, the tile adjacent is shifted one base unit to the bottom. This allows Tile 2 to be accommodated. The shifting of tile adjacent results in an empty area A, as shown in FIG. 11d. The empty area is 1×2 in size. The empty areas are sub-divided into A2 and A3, each having a size of 1×1 (base unit).

In FIG. 11e, Tile 8 is absorbed into A2 based on the momentum absorption rules. This results in an empty area being created, which has size 1×2. Tile 11 can be absorbed into the newly created empty area. The resulting page is convex.

FIGS. 12a-12b shows an example of a tile resizing in a horizontal page 1200. The page includes Tile 1 to Tile 10. Referring to FIG. 12a, Tile 5 is selected to be resized from a 1×2 size to a 1×1 size. The resizing of Tile 5 results in an empty area A1. Tile 9 or Tile 10 can be absorbed into A1. Since the page is horizontal, preference is given to Tile 10, as shown in FIG. 12b. The resulting page is convex.

Referring to FIGS. 13a-13d, an example of a tile resizing in a vertical page 1300 is shown. The page includes Tile 1 to Tile 10. Referring to FIG. 11a, Tile 7 is selected to be resized from 1×1 to 2×1. FIG. 13b shows a tile adjacent 1360 which is determined. The tile adjacent is shifted two base units downwards to accommodate the expansion of Tile 7, as shown in FIG. 13c. The shifting of tile adjacent creates empty areas A1 and A2. Empty area A2 is 1×2 in size. Empty area A2 is sub-divided into A2₁ and A2₂, each being 1×1.

Empty area A1 is filled with Tile 8, as shown in FIG. 13d. Empty areas A2$_1$ and A2$_2$ are filled with Tile 5, which is 1×2. The area vacated by Tile 5 is filled by Tile 9. The resulting page is convex. In the case if a page is not convex, the user make changes to achieve a convex page.

Referring to FIGS. 14a-14e, an example of a tile resizing in a horizontal page 1400 is shown. The page includes Tiles 1-7. Referring to FIG. 14a, Tile 7 is selected to be resized from 1×1 to 2×1. FIG. 14b shows a tile adjacent 1460 which is determined. The tile adjacent is shifted one base unit to the right to accommodate the expansion of Tile 7, as shown in FIG. 14c. Expansion of Tile 7 may take into account the average view affinities of surrounding tiles. The shifting of tile adjacent creates empty areas A1, A2 and A3.

Empty area A1 is filled with Tile 3, as shown in FIG. 14d. For example, A1 is the closest empty area to the focus tile and preference of shifting is in the horizontal direction. Filling A1 with Tile 3 creates empty area A4. Since A4 is the next closest empty area to the focus tile, it is filled next. As shown in FIG. 14e, A4 is filled with Tile 5. Additional momentum absorption includes filling A3 with Tile 4 and A2 with Tile 6. This results in a convex page. Tiles being absorbed may take view affinities of surrounding tiles into consideration.

As described, layout arranger may be embodied as an application. For example, the layout arranger may be embodied as a software application. The application may be integrated into an existing software application, such as a web-based application, as an add-on or plug-in to an existing application, or as a separate stand-alone application. The existing software application may be a suite of software applications. The source code of the display system may be compiled to create an executable code. The codes, for example, may be stored in a storage medium, such as one or more storage disks. Other types of storage media may also be useful.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A computer-implemented method for arranging tiles comprising:
providing a tile-based page having one or more tiles forming a page layout, wherein
the tile-based page includes a focus tile, the focus tile has a fixed position once selected or determined in the tile-based page and serves as a benchmark for changes in tiles of the tile-based page,
a tile of the tile-based page comprises a size which is a multiple of a tile base unit, and
the tile-based page enables tiles having different sizes including the tile base unit and any multiple of the tile base unit which is greater than 1;
in response to a user event to indicate a tile change in the page layout, wherein the tile change includes a tile movement change, a tile resizing change, a tile addition change or a tile deletion change;
determining a tile adjacent in the page layout, wherein the tile adjacent is the minimum area to be shifted to effect the tile change, the tile adjacent can include no tiles or one or more tiles;
absorbing tiles into empty areas created by the tile change, wherein absorbing tiles includes performing an absorption analysis comprising
identifying an empty area,
calculating the tile distance of tiles from the focus tile,
identifying potential tiles for absorption,
selecting one of the potential tiles for absorption, if any,
absorbing the selected potential tile into the empty area,
wherein the view of the selected potential tile takes into consideration of the average view affinity of tiles surrounding the empty area, and if more empty areas exist, repeat performing absorption analysis;

analyzing the changed layout to determine if the tile-based page is a convex page, wherein the tile-based page is determined to be the convex page in response to first lines from a center of the focus tile to centers of non-focus tiles not crossing over an empty area, and a second line which crosses the empty area being longer than the first lines, wherein the empty area is equal to at least one of the tile base unit; and in response to determining that the tile-based page is a convex page, enabling a user to save or cancel the changed layout.

2. A computer-implemented method for arranging tiles comprising:

providing a tile-based page having one or more tiles forming a page layout, the tile-based page includes, a focus tile, the focus tile has a fixed position once selected or determined in the tile-based page and serves as a benchmark for changes in tiles of the tile-based page, a tile of the tile-based page comprises a size which is a multiple of a tile base unit, and the tile-based page enables tiles having different sizes including the tile base unit and any multiple of the tile base unit which is 1 or greater than 1;

in response to a user event to indicate a tile change in the page layout, wherein the tile change includes a tile movement change, a tile resizing change, a tile addition change or a tile deletion change;

determining a tile adjacent in the page layout, wherein the tile adjacent is the minimum area to be shifted to effect the tile change;

absorbing a tile into an empty area using an absorption analysis;

analyzing the changed layout to determine if the tile-based page is a convex page, wherein the tile-based page is determined to be the convex page in response to first lines from a center of the focus tile to centers of non-focus tiles not crossing over an empty area, and a second line which crosses the empty area being longer than the first lines, wherein the empty area is equal to at least one of the tile base unit; and in response to determining that the tile-based page is a convex page, enabling a user to save or cancel the changed layout.

3. The computer-implemented method of claim 2 wherein the size of any tile of the page comprises any multiple of a tile base unit.

4. The computer-implemented method of claim 2 wherein the tile-based page is a fixed page type, a horizontal page type, a vertical page type or a stretchable page type.

5. The computer-implemented method of claim 4 wherein absorption of the tile into the empty space is along the direction of the page type.

6. The computer-implemented method of claim 4 wherein the user may define a direction for absorption.

7. The computer-implemented method of claim 2 wherein the focus tile may be disposed anywhere in the page except adjacent to a non-border of the page.

8. The computer-implemented method of claim 7 wherein absorbing the tile comprises:

identifying the empty area;

calculating tile distance of the tiles with respect to the focus tile;

identifying potential tiles for absorption into the empty area;

selecting one of the potential tiles for absorption; and moving the selected potential tile to the empty area.

9. The computer-implemented method of claim 8 wherein moving the selected potential tile takes into consideration of the average view affinity of tiles surrounding the empty area.

10. The computer-implemented method of claim 9 wherein the selected potential tile adopts a view which has the nearest affinity to the average view affinity of tiles surrounding the empty area.

11. The computer-implemented method of claim 2 wherein the tile change comprises a tile move; a tile resizing; a tile addition; or a tile deletion.

12. The computer-implemented method of claim 11 wherein effecting a tile move change comprises:

moving a selected tile from a first location to a second location;

absorbing an empty area at the first location vacated by the selected tile;

identifying the tile adjacent;

shifting the tile adjacent along a direction corresponding to a type of the page to accommodate the selected tile at the second location; and absorbing empty areas resulting from shifting the tile adjacent.

13. The computer-implemented method of claim 12 wherein absorbing the empty area or areas is toward a minimum convex value.

14. The computer-implemented method of claim 12 wherein absorbing the empty area or areas includes a view affinity analysis.

15. The computer-implemented method of claim 11, wherein effecting the tile resizing change, the tile addition change or the tile deletion change comprises:

identifying the tile adjacent;

shifting the tile adjacent along a direction corresponding to a type of the page to accommodate a selected tile at a location; and absorbing the empty areas resulting from shifting the tile adjacent.

16. The computer-implemented method of claim 15 wherein absorbing the empty areas is toward a minimum convex value.

17. The computer-implemented method of claim 15 wherein absorbing the empty areas includes a view affinity analysis.

18. The computer-implemented method of claim 15 wherein effecting the tile resizing change comprises performing a view affinity analysis for a selected tile for resizing.

19. A system comprising:

a non-transitory memory device for storing computer readable program code; and a processor in communication with the memory device, the processor being operative with the computer readable program code to receive a tile-based page having one or more tiles forming a page layout, the tile-based page includes, a focus tile, the focus tile has a fixed position once selected or determined in the tile-based page and serves as a benchmark for changes in tiles of the tile-based page, a tile of the tile-based page comprises a size which is a multiple of a tile base unit, and the tile page enables tiles having different sizes including the tile base unit and any multiple of the tile base unit which is 1 or greater than 1, detect a tile change to the page layout, wherein the tile change includes a tile movement change, a tile resizing change, a tile addition change or a tile deletion change, determine a tile adjacent in the page layout, wherein the tile adjacent is the minimum area to be shifted to effect the tile change, absorb a tile into an empty area using an absorption analysis, analyze the changed layout to determine if the tile-based page is a convex page, wherein the tile-based page is determined to be the convex page in response to first lines from a center of the focus tile to centers of non-focus tiles not crossing over an empty area, and a second line which crosses the empty area being longer than the first lines, wherein the empty area is equal to at least one of the tile base unit, and in response to determining that the tile-based page is a convex page, enable a user to save or cancel the changed layout.

20. The system of claim 19 wherein the tile adjacent is shifted along a direction based on a type of the page.

\* \* \* \* \*